US009033228B2

(12) United States Patent
Govindarajan et al.

(10) Patent No.: US 9,033,228 B2
(45) Date of Patent: May 19, 2015

(54) POINT-OF-SALE SYSTEMS (71) Applicant: EBAY INC., San Jose, CA (US)

(72) Inventors: Satish Govindarajan, Los Altos, CA (US); Michael Voege, Santa Clara, CA (US); Murthy Bobba, Los Altos, CA (US); Khiem Pham, Pleasanton, CA (US); Gunabalan Babu, Waterloo (CA); Uris Dacosta, San Jose, CA (US); Richard Tilghman, San Jose, CA (US); Daniel Potter, San Jose, CA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 14/099,681

(22) Filed: Dec. 6, 2013

(65) Prior Publication Data

US 2015/0001291 A1 Jan. 1, 2015

Related U.S. Application Data (60) Provisional application No. 61/839,692, filed on Jun. 26, 2013.

(51) Int. Cl.
*G06K 15/00* (2006.01)
*G06Q 90/00* (2006.01)

(52) U.S. Cl.
CPC .................... *G06Q 90/00* (2013.01)

(58) Field of Classification Search
CPC ........................................ G06Q 90/00
USPC .................................. 235/379–383
See application file for complete search history.

(56) References Cited

U.S. PATENT DOCUMENTS

| 2002/0170964 | A1* | 11/2002 | Sabella ......................... 235/449 |
| 2003/0132292 | A1* | 7/2003 | Gomez et al. ................. 235/383 |
| 2004/0058705 | A1* | 3/2004 | Morgan et al. ............. 455/556.1 |
| 2005/0230472 | A1* | 10/2005 | Chang .......................... 235/383 |
| 2006/0065724 | A1* | 3/2006 | Lum ............................. 235/383 |
| 2009/0145958 | A1* | 6/2009 | Stoutenburg et al. ......... 235/376 |
| 2009/0250515 | A1* | 10/2009 | Todd et al. .................... 235/383 |
| 2010/0057620 | A1* | 3/2010 | Li et al. .......................... 705/71 |
| 2013/0075543 | A1* | 3/2013 | Krohn et al. .................. 248/121 |
| 2014/0089077 | A1* | 3/2014 | Zuckerman et al. ....... 705/14.37 |

* cited by examiner

*Primary Examiner* — Tuyen K Vo
(74) *Attorney, Agent, or Firm* — Haynes and Boone, LLP (57) ABSTRACT A point-of-sale (POS) system is provided. The POS system may include an adjustable housing configured to receive a computing device. The POS system housing may be adjustable so that a screen of the computing device can be viewed by a merchant and a customer. The computing device may be removable from the housing for use as a mobile POS system. The POS system may also include electronics for accepting various forms of payment and for connecting the computing device to a network.

22 Claims, 12 Drawing Sheets

POINT-OF-SALE SYSTEMS

CROSS REFERENCE TO RELATED APPLICATIONS

Pursuant to 35 U.S.C. §119(e), this application claims priority to the filing date of U.S. Provisional Patent Application No. 61/839,692, filed on Jun. 26, 2013, the disclosure of which is hereby incorporated by reference in its entirety.

BACKGROUND

1. Technical Field

Embodiments disclosed herein are related to point-of-sale systems.

2. Related Art

Point-of-sale (POS) systems traditionally have been fixed terminals, such as a cash register, a computer terminal executing merchant-specific applications for processing transactions, a scale, barcode scanner, and the like. These traditional terminals are useful for placing behind a counter and conducting transactions at the counter. However, when a merchant wants or needs to conduct a transaction away from the counter, they are unable to move the fixed terminal, and must rely on other ways of conducting the transaction, or require the customer to come to the counter. Fixed POS terminals usually have a single screen that can be viewed by the merchant and sometimes by the customer, and may only provide a small display to the customer, if at all. Moreover, fixed terminals are typically fixed in the software sense as well, as the applications used on the terminals are typically fixed, developed, owned, and even controlled by the terminal manufacturer or distributor, and are not able to be easily modified or adaptable to meet the needs of the merchant.

BRIEF DESCRIPTION OF THE FIGURES

In the drawings, elements having the same designation have the same or similar functions.

DETAILED DESCRIPTION

In the following description, specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

What is needed are POS systems with additional functionalities and alternative form factors, and provide a convenient bridge between traditional stationary POS systems and mobile POS systems.

Consistent with some embodiments, there is provided a point-of-sale (POS) system. The POS system includes a stand, the stand including an adjustable arm configured to be adjusted between at least a first stand position and a second stand position. The POS system also includes a housing coupled to the stand. The housing includes a first housing portion having a printed circuit board (PCB) attached thereto, a second housing portion having a side panel attached to a first side, and a magnetic stripe reader attached to a second side. The housing is also configured to removably enclose a computing device between the first housing portion and the second housing portion, the computing device being removable through at least the side panel, wherein the computing device faces a merchant at the first stand position, and faces a customer at the second stand position.

Consistent with some embodiments, there is further provided a point-of-sale (POS) system. The POS system includes a housing configured to support a computing device in communication with a payment service provider over a network, the payment service provider server processes transactions performed at the point-of-sale system. The POS system also includes a stand coupled to the housing and a card reader coupled to the housing and the stand.

Embodiments described herein may provide a POS system that a merchant can use at a fixed location such as a counter, while also allowing the merchant to use the POS system as a mobile POS system. Embodiments described herein may also provide a POS system that can be used by customers as a mobile POS system. In some embodiments, existing computing devices may be coupled to or enclosed in the POS systems and the one or more processors of the computing device may execute merchant applications to provide the POS functionality. Described embodiments that use existing computing devices coupled to or enclosed in a POS system may provide functionalities to the merchant for using the computing device at a fixed or mobile location, and allowing better interaction between the merchant and the customer.

These and other embodiments will be described in further detail below with respect to the following figures.

Figure 1:
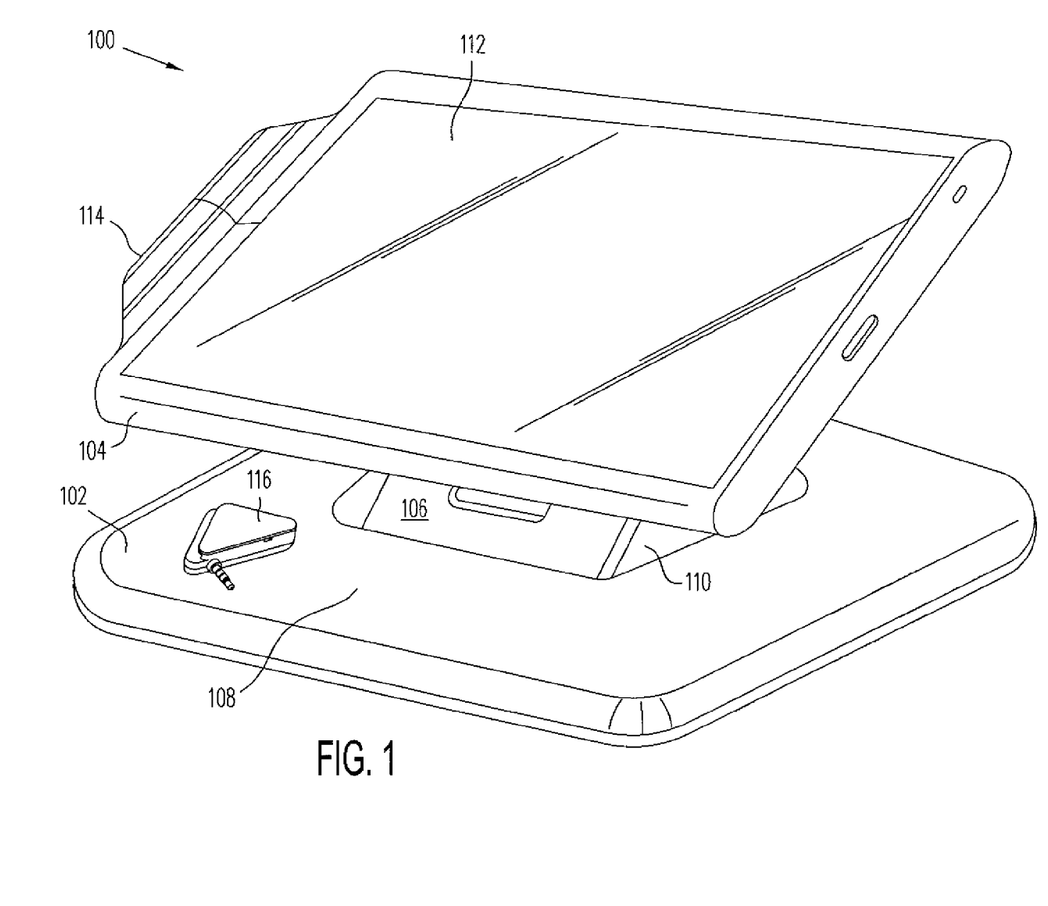
FIG. 1 is a detailed illustration of a point-of-sale (POS) system, consistent with some embodiments.

FIG. 1 is a detailed illustration of a POS system 100, consistent with some embodiments. As shown in FIG. 1, POS system 100 includes stand 102 and housing 104. In some embodiments, housing 104 may be mounted on or otherwise attached to stand 102. Stand 102 may include an arm 106 protruding from an approximate center area of stand 102. Arm 106 may have one or more pivotable joints (not shown) for moving housing 104 between one or more positions, angles, or orientations.

Stand 102 may also include a base 108. In some embodiments, base 108 may be part of stand 102, or an area of stand 102. In some embodiments, base 108 may be wide and long enough to be placed onto a surface and support housing 104. In some embodiments, base 108 may have a hole 110 in a center thereof wherein arm 106 may occupy the space of hole 110 when arm 106 is pivoted into a flat position. Arm 106 may be attached to base 108 via one or more connection points at the edge of hole 110. In some embodiments, arm 106 may be detachable from base 108 and stand 102 and may be mounted directly onto other surfaces.

Although not shown in FIG. 1, base 108 may be angularly rotatable in one or more directions in some embodiments. For example, base 108 may be cylindrical and extend from a first end of housing 104 to a second end of housing 104 while supporting housing 104 such that housing 104 is rotatable about the cylindrical base 108. As another example, base 108 may be rotatable in a plane parallel to base 108 such that housing 104 may be rotated from a first position to a second position opposite the first position, and other positions in between, in a "lazy susan" fashion.

Returning to FIG. 1, system 100 includes a computing device 112 having a screen. In some embodiments, computing device 112 may be a tablet computer, a smartphone, or phone-tablet combination ("phablet"), such as would be provided on a device running the iOS™ operating system, Android™ operating system, or Windows® operating system. The screen of computing device 112 may be a touch screen, such as a capacitive sensor touch screen. Computing device 112 may be removably enclosed in housing 104 such that computing device 112 may be removed from housing 104 and used as a mobile POS system. In some embodiments, housing 104 may be constructed based on a particular form factor, such as 10" tablets, 7" tablets, or 4.0"-4.5" smartphones, and the like. In some embodiments, housing 104 may be constructed to house different form factors in a same housing 104. Such embodiments may include adaptable spacers, other enclosure parts, which could be customized to fit a specific form factor, and connections for accommodating multiple form factors.

System 100 may also include a card reader 114 that may be coupled to housing 104. Card reader 114 may be a magnetic stripe reader and may be optionally attached to housing 104. Moreover, although card reader 114 is shown on one side of housing 104, card reader 114 may also be attached on other sides of housing 104, or may be separate and electrically connected to housing 104 and POS system 100. Card reader 114 may be integrated into housing 104 in some embodiments. System 100 may also include a mobile card reader 116 that may be coupled to computing device 112 when computing device 112 is removed from housing 104.

In some embodiments, POS system 100 may have one or more apps or applications stored thereon that may be capable of facilitating transactions using computing device 112. For example, computing device 112 may include a scanning application, such as RedLaser, that may be capable of scanning or capturing an image of a code printed on a product and performing a lookup of the product based on the code to determine information about the product, such as a price of the product. Payment for the products may be performed at POS system 100 by swiping a card in card reader 114 or mobile card reader 116, or by using computing device 112 to authorize a payment using a payment processing service provider such as provided by PayPal, Inc. of San Jose, Calif.

Figure 2A:
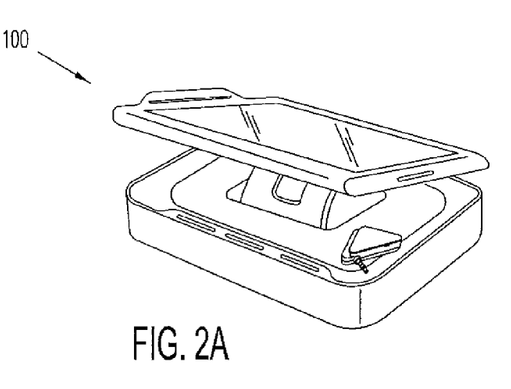
FIGS. 2A-2F illustrate a POS system in different orientations, consistent with some embodiments.
Figure 2B:
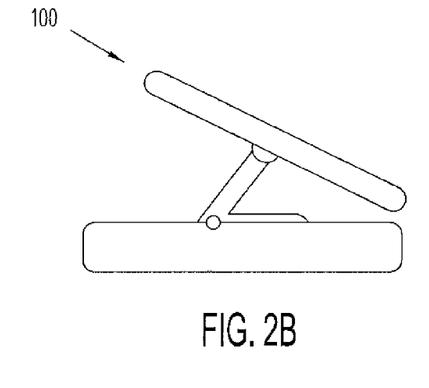
Figure 2C:
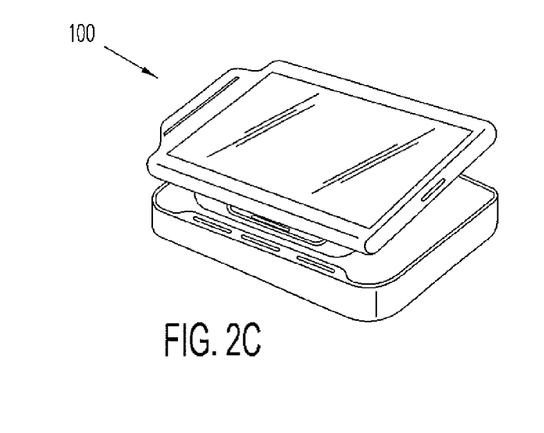
Figure 2D:
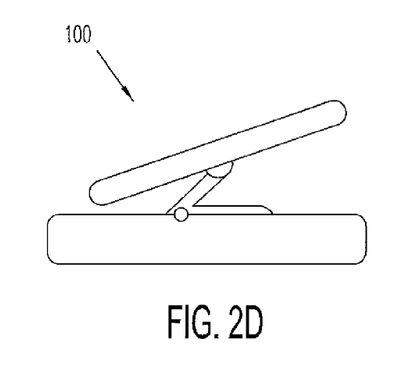

FIGS. 2A-2F illustrate POS system 100 in different orientations, consistent with some embodiments. As shown in FIGS. 2A and 2B, POS system 100 may be oriented in a first orientation, wherein the first orientation is a merchant-facing orientation. In the first orientation, a merchant may be able to read graphics and text displayed on computing device 112 of POS system 100 and interact with the displayed graphics and text and on-screen functions. For example, a merchant may use one or more merchant or payment applications to create an invoice, bill of sale, or other payment due for a customer based on items that the customer is purchasing. When the customer is ready to complete the purchase, housing 104 of POS system 100 may be rotated, tilted, angled, or otherwise positioned such that computing device 112 is oriented in a second orientation, which may be a consumer-facing orientation, such as shown in FIGS. 2C and 2D. In some embodiments, housing 104 enclosing computing system 112 may be rotatable or pivotable on arm 106 coupled to base 108. Moreover, in some embodiments, orienting computer device 112 may be configured to display a custom customer user interface when oriented in a consumer-facing orientation. The customer may then be able to review the invoice or bill of sale, select payment options, swipe a payment card, enter credentials for a payment handled by a payment processing server, such as may be provided by PayPal, Inc. of San Jose, Calif., and/or digitally sign for a purchase.

Figure 2E:
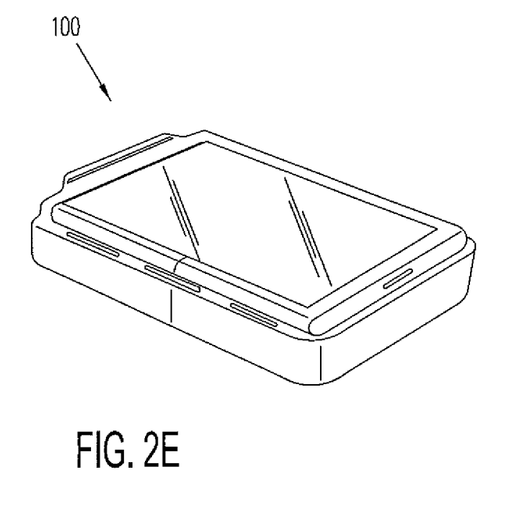
Figure 2F:
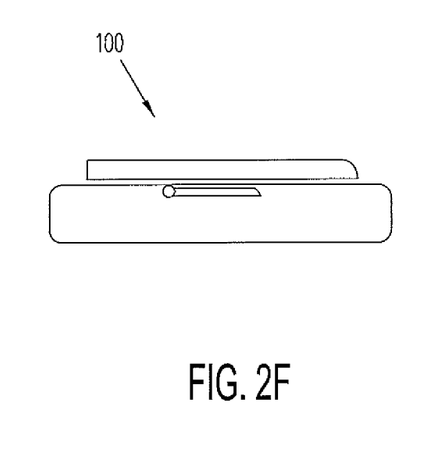

As shown in FIGS. 2E and 2F, when POS system 100 is not in use or when moving POS system 100 or storing POS system 100, POS system 100 may be oriented in a third orientation, which is a flat orientation. In some embodiments, the flat orientation or position shown in FIGS. 2E and 2F may also allow a merchant and a customer to simultaneously review information displayed on computing device 112 of POS system 100, with a screen of computing device 112 facing upwards. Moreover, in some embodiments, a screen of computing device 112 may be rotated 180° such that a screen of computing device 112 is facing downwards to hide the screen when not in use and protect the screen of computing device 112 and to prevent theft of POS system 100. Although only three different orientations of housing 104 of POS system 100 are shown in FIGS. 2A-2F, other orientations are possible. Moreover, even though the orientations are described as being achieved by housing 104 pivoting or rotating on a pivotable or rotatable arm 106, other structures may be used to pivot or rotate housing 104 of POS system to the orientations shown in FIGS. 2A-2F, including structures described previously.

Figure 3A:
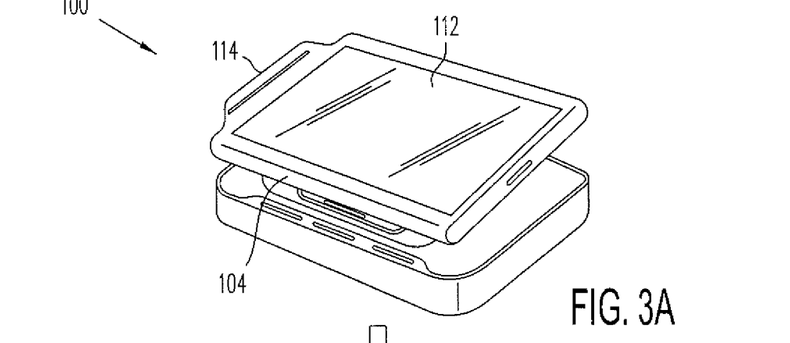
FIGS. 3A-3D are diagrams illustrating removing a computing device from a POS system and using the computing device as a mobile POS terminal, consistent with some embodiments.
Figure 3B:
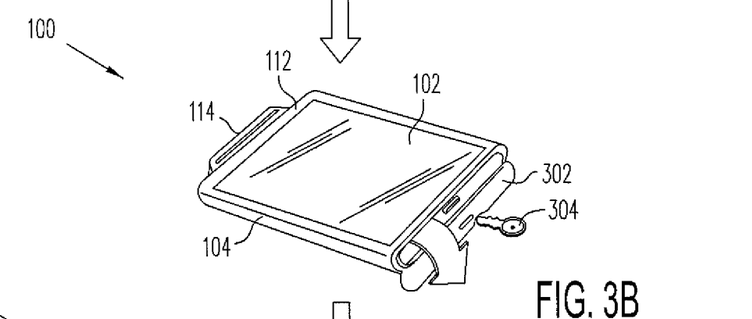

FIGS. 3A-3D are diagrams illustrating using POS system 100 as a mobile POS terminal by removing computing device 112, consistent with some embodiments. As shown in FIG. 3A, housing 104 of POS system 100 may enclose computing device 112. In some embodiments, housing 104 may be sealable and lockable. As shown in FIG. 3B, housing 104 may be opened to remove computing device 112. In some embodiments, housing 104 may have a side panel 302 that may be opened to remove computing device 112. In some embodiments, side panel 302 may be locked, and a key 304 may be required to open side panel 302 to remove computing device 112 to provide security for computing device 112. In some embodiments, side panel 302 may be locked by a digital locking mechanism instead or of or in addition to a mechanical locking mechanism requiring key 304. For example, side panel 302 may be unlocked by entering a code or password or other security credential into computing device 112. As another example, side panel 302 may be unlocked by swiping an employee access card or similar through card reader 114 or another reader included in system 100.

Figures 3C, 3D:
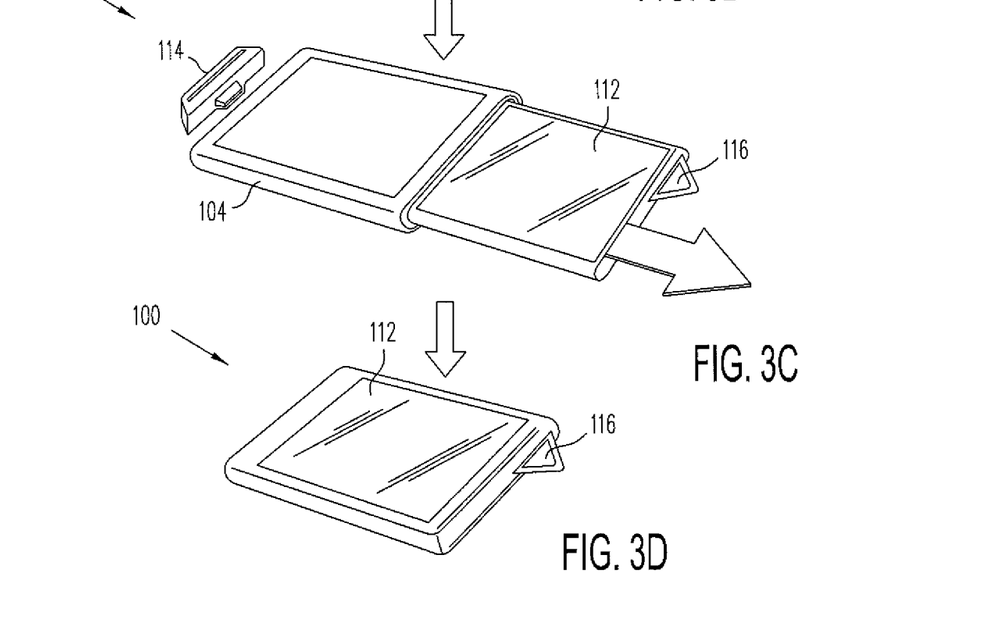

As shown in FIG. 3C, after side panel 302 has been opened, card reader 114 can be detached from housing 104 and computing device 112. Computing device 112 may then be removed from housing 104. A user may then attach mobile card reader 116 to computing device 112. In some embodiments, housing 104 may have sufficient room such that mobile card reader 116 is attached even when computing device 112 is inside housing 104. In some embodiments, mobile card reader 116 may be a PayPal Here card reader provided by PayPal, Inc. of San Jose, Calif. As shown in FIG.

3D, a merchant or other user may then use computing device 112 with mobile card reader 116 to conduct transactions while being mobile.

Figure 4:
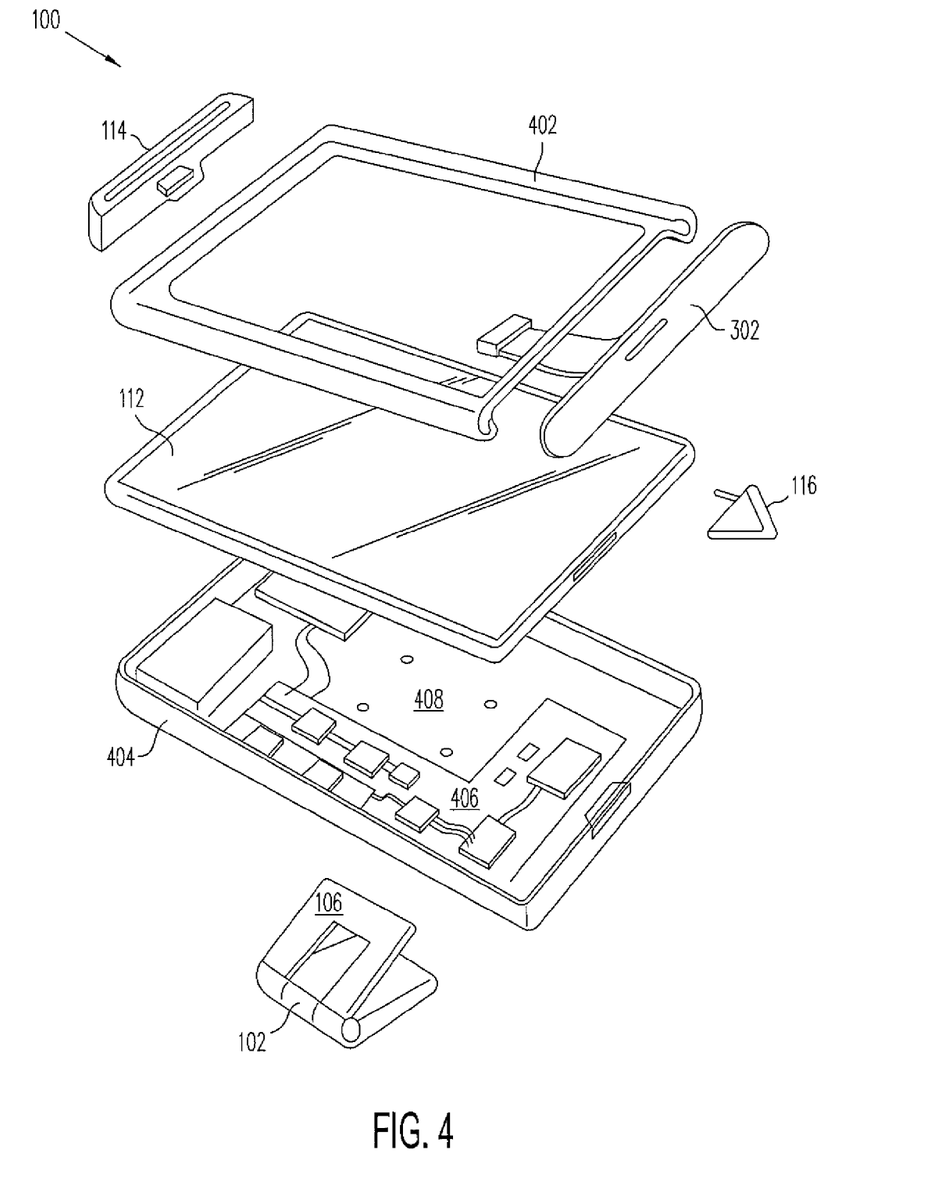
FIG. 4 is an exploded view of a POS system, consistent with some embodiments.

FIG. 4 is an exploded view of POS system 100, consistent with some embodiments. As shown in FIG. 4, housing 104 includes an upper housing 402 and a lower housing 404. Lower housing 404 may include a printed circuit board (PCB) and other components 406 and components for the functions of POS system 100. Lower housing 404 may also include mounting points 408 to which stand 102 having base 108 may be attached. In some embodiments, arm 106 may be directly attached to mounting points 106. Upper housing 402 may include side panel 302 and card reader 114. Computing device 112 may sit within housing 104 between upper housing 402 and lower housing 404. When assembled, side panel 302 may be opened so that computing device 112 may be removed and mobile card reader 116 can be attached. Side panel 302 may include a locking mechanism in some embodiments.

Figure 5:
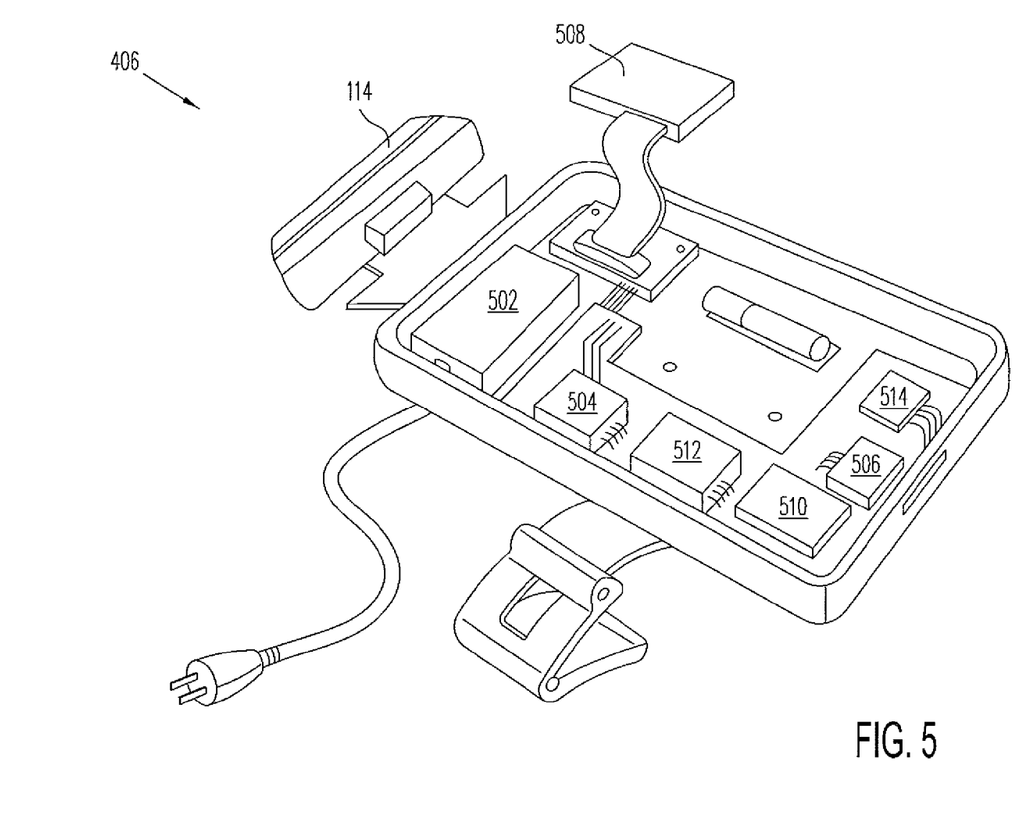
FIG. 5 is a diagram illustrating a printed circuit board and components of a lower housing of a POS system, consistent with some embodiments.

FIG. 5 is a diagram illustrating PCB and components 406 of lower housing 404, consistent with some embodiments. As shown in FIG. 4, PCB and components 406 may include a power supply 502, one or more universal serial bus (USB) ports 504, one or more Apple® 30-pin connector or Lightning™ connectors 506 and a near-field communications (NFC) module 508. PCB and components 406 may also include a built-in wireless router or access point 510 for creating a wireless hotspot such that computing device 112 and other wireless-capable devices can wirelessly connect to router 510. PCB and components 406 may also include a Bluetooth low energy (BLE) beacon 512 for providing a low energy wireless connection to computing device 112 or other devices. In some embodiments, BLE beacon 512 may be used to automatically check customers in and/or process payments, such as is described in U.S. patent application Ser. No. 14/021,045, filed Sep. 9, 2013, the entire contents of which is hereby incorporated by reference in its entirety. Components 502-512 may be mounted on or otherwise coupled to PCB 406. As shown in FIG. 5, card reader 114 and a locking mechanism 514 may also be coupled to or mounted on PCB 406. Locking mechanism 514 may be a mechanical locking mechanism, or a digital locking mechanism, or a combination thereof.

Figure 6:
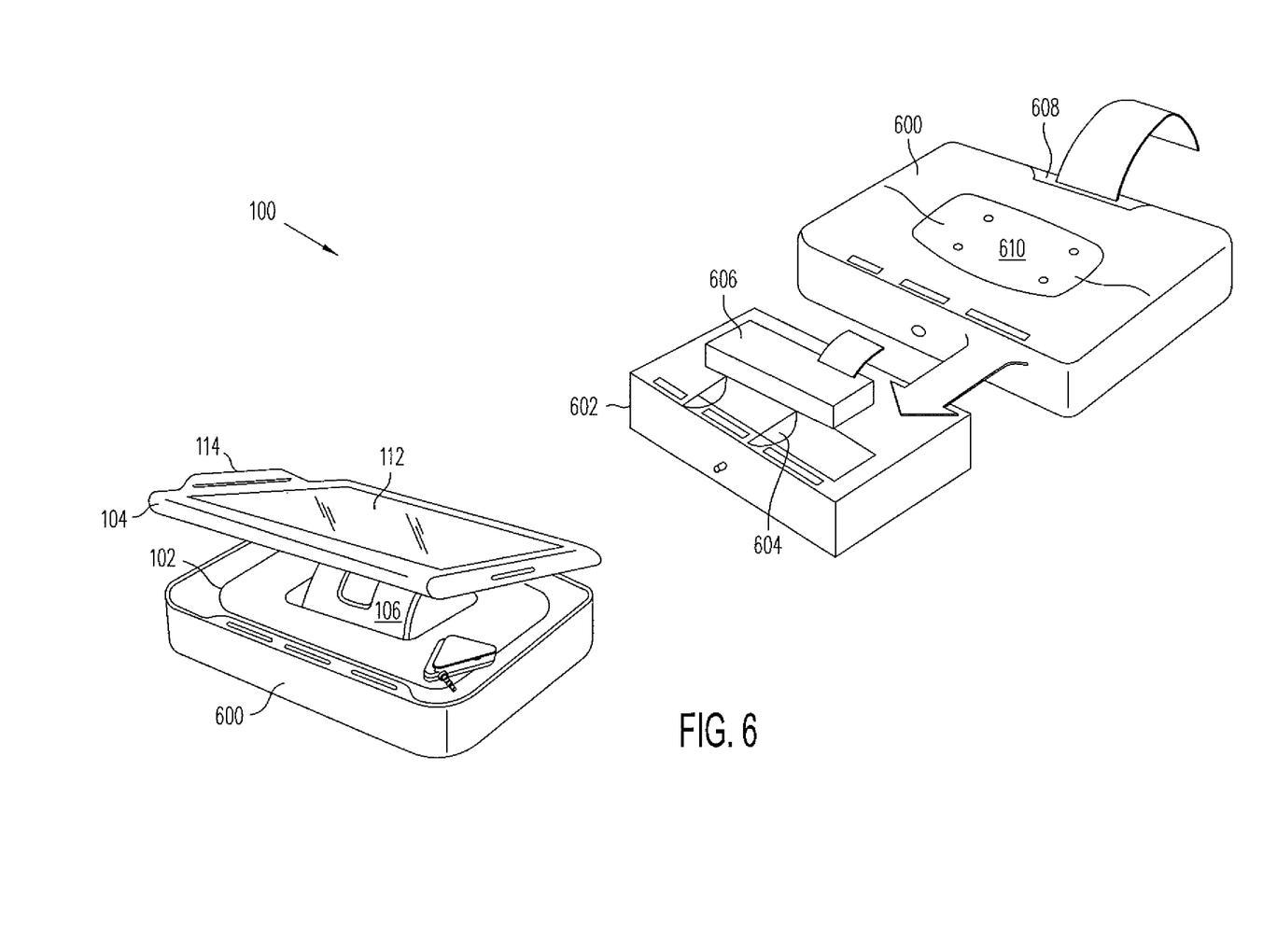
FIG. 6 is a diagram illustrating a POS system having a register component, consistent with some embodiments.

FIG. 6 is a diagram illustrating POS system 100 having a register component 600, consistent with some embodiments. As shown in FIG. 6, stand 102 may sit on or otherwise be attached to register component 600. In some embodiments, as described previously, arm 106 may be detachable from base 108 and stand 102 and may be mounted or attached on other surfaces. Consequently, in some embodiments, arm 106 may be attached to register component 600. Register component 600 may include a removable cash till or drawer 602 having one or more bill collection slots and a cash collection area 604. Cash till or drawer 602 may also have a printer 606 for printing receipts. Register component 600 may include a receipt outlet 608 at an end thereof so that printer may print receipts out of register component 600 when cash till or drawer 602 is within register component 600. In some embodiments, a surface of receipt component 600 may include mountings 610 for mounting or otherwise attaching stand 102 or arm 106 to register component 600. Although not shown in FIG. 6, POS system may also be coupled to additional accessories as well, including a bar code or other code scanner, a scale, and the like. In some embodiments, printer 606 may be external to register component 600 and coupled wirelessly or by a wired coupling to POS system 100.

Figure 7:
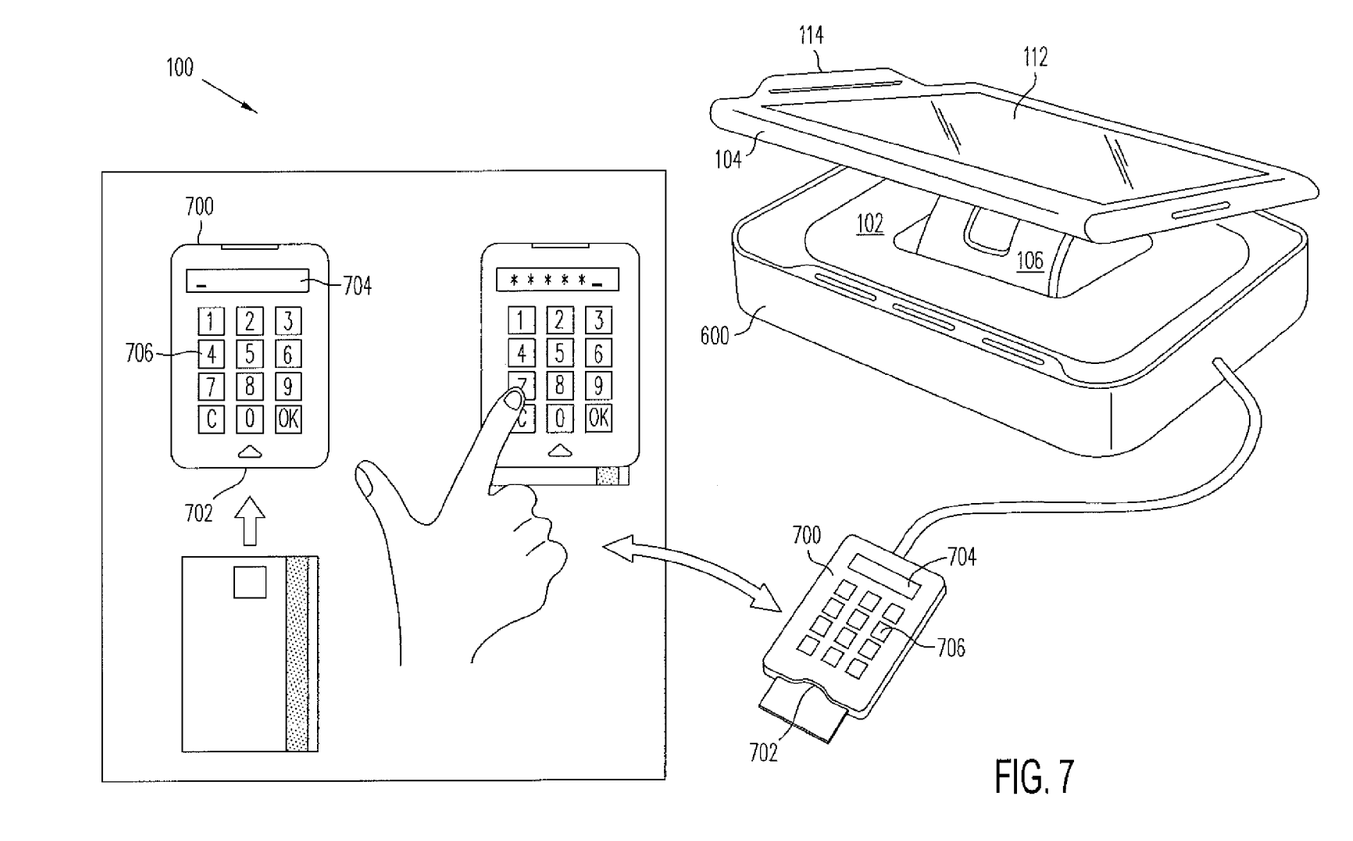
FIG. 7 is a diagram illustrating a POS system having chip and personal identification number (PIN) integration, consistent with some embodiments.

FIG. 7 is a diagram illustrating POS system 100 having chip and personal identification number (PIN) integration, consistent with some embodiments. As shown in FIG. 7, POS system 100 may have a "Chip & PIN" device 700 attached thereto. Chip and PIN device 700 may be coupled to POS system 100 either through a wire, such as shown in FIG. 7, or a wireless coupling. Chip and PIN device 700 may be detachably coupled to POS system. Chip and PIN device 700 may fully comply with EMV (Europay, Mastercard and Visa) standards, such as ISO/IEC 7816 and/or ISO/IEC 14443. For example, Chip and PIN device 700 may have a slot 702 for receiving a card having a chip, a small display 704 for entering a PIN, and a PIN pad 706 for entering the PIN. Display 704 may include a mask, hood, or may include other functionality for masking an entered PIN according to the Chip and PIN standards. In some embodiments, Chip and PIN device 700 may not include display 704. In some embodiments, Chip and PIN device may also include a magnetic stripe reader for accepting and reading cards that do not have a chip. Although FIG. 7 illustrates Chip and PIN device 700 being coupled to POS system 100 using a wire, Chip and PIN device 700 may include one or more wireless transceivers for wirelessly coupling to POS system 100.

Figure 8:
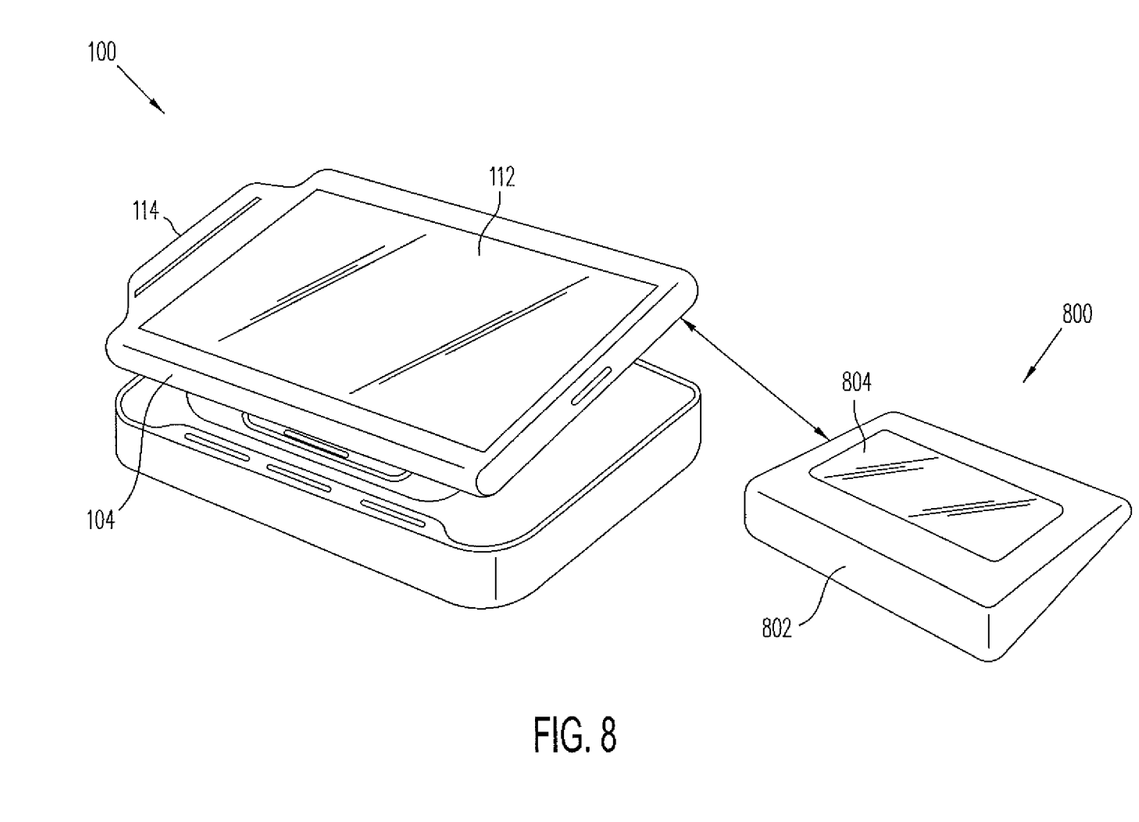
FIG. 8 is a diagram illustrating a POS system having a secondary device, consistent with some embodiments.

FIG. 8 is a diagram illustrating POS system 100 having a secondary device 800, consistent with some embodiments. As shown in FIG. 8, secondary device 800 may be coupled to POS system 100 for use by a merchant or buyer. Secondary device 800 may be a smartphone, tablet, and the like, and may be similar or the same as computing device 112. In some embodiments, secondary device 800 may have a smaller form factor than computing device 112. Secondary device 800 may be coupled to POS system 100 by a wired or wireless connection, and may provide a separate interface for use in a transaction. In some embodiments, a merchant may use POS system 100 to process a transaction and provide a customer or buyer with secondary device 800 to authorize the transaction, sign their name, or otherwise authorize the transaction. In some embodiments, secondary device 800 may include a housing 802 enclosing a secondary computer device 804. In some embodiments, a card reader may be attached to housing 802 or secondary computer device 804 for processing card-based payments. In further embodiments, secondary device 800 may be integrated into POS system 100, such as in stand 102 or register component 600, such that a consumer-facing secondary computer device 804 may be removably included in POS system 100.

Figure 9:
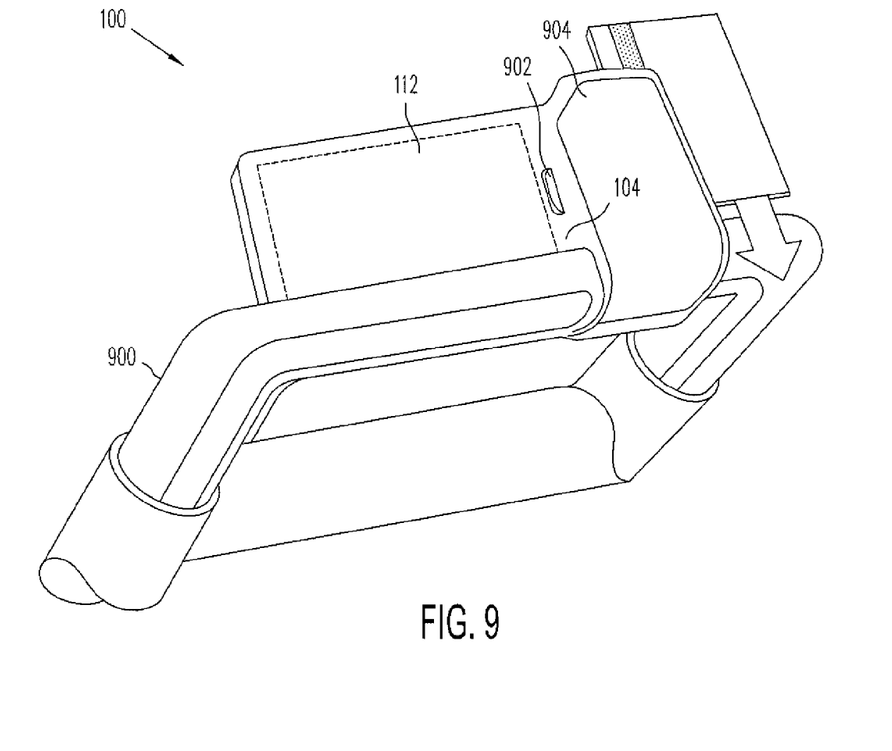
FIG. 9 is a diagram illustrating a POS system mounted on a cart, consistent with some embodiments.

FIG. 9 is a diagram illustrating POS system 100 mounted on a cart 900, consistent with some embodiments. As shown in FIG. 9, POS system 100 may have housing 104 enclosing computing device 112 mounted on cart 900, such as a shopping cart. In some embodiments, housing 104 may include a dock 902 for securing computing device 112 and providing an electrical and/or data coupling to computing device 112. For example, dock 902 may be coupled to a power source or capable of storing a charge, such that computing device 112 may be charged when computing device 112 is connected to dock 902. In some embodiments, dock 902 may provide a physical connection to a card reader 904. In some embodiments, dock 902 may be an actual dock, such as described above but, in some embodiments, dock 902 may just be an area for holding computing device 112, such that reader 904 may be coupled to computing device 112 by other means, such as a wireless connection.

In some embodiments, POS system 100 may allow a customer inside a store to scan and to pay for items by acting as a self-checkout system utilizing computing device 112. In some embodiments, computing device 112 used in POS system shown in FIG. 9 may be a computing device 112 supplied by a customer. For example, computing device 112 may have one or more apps or applications stored thereon that may be capable of facilitating transactions using computing device 112. For example, computing device 112 may include a scanning application, such as RedLaser, that may be capable of capturing an image of a code printed on a product and performing a lookup of the product based on the code to determine information about the product, such as a price of the product. In some embodiments, the customer or user may attach their computing device 112 to POS system 100, and POS system 100 may allow a user to scan a product that they wish to purchase, and then confirm that they want to purchase the item. The user may then put the product into cart 900 and move on to the next product. Payment for the products may be performed at POS system 100 by swiping a card in card reader 904, or by using computing device 112 to authorize a payment using a payment processing service provider such as provided by PayPal, Inc. of San Jose, Calif.

Figure 10:
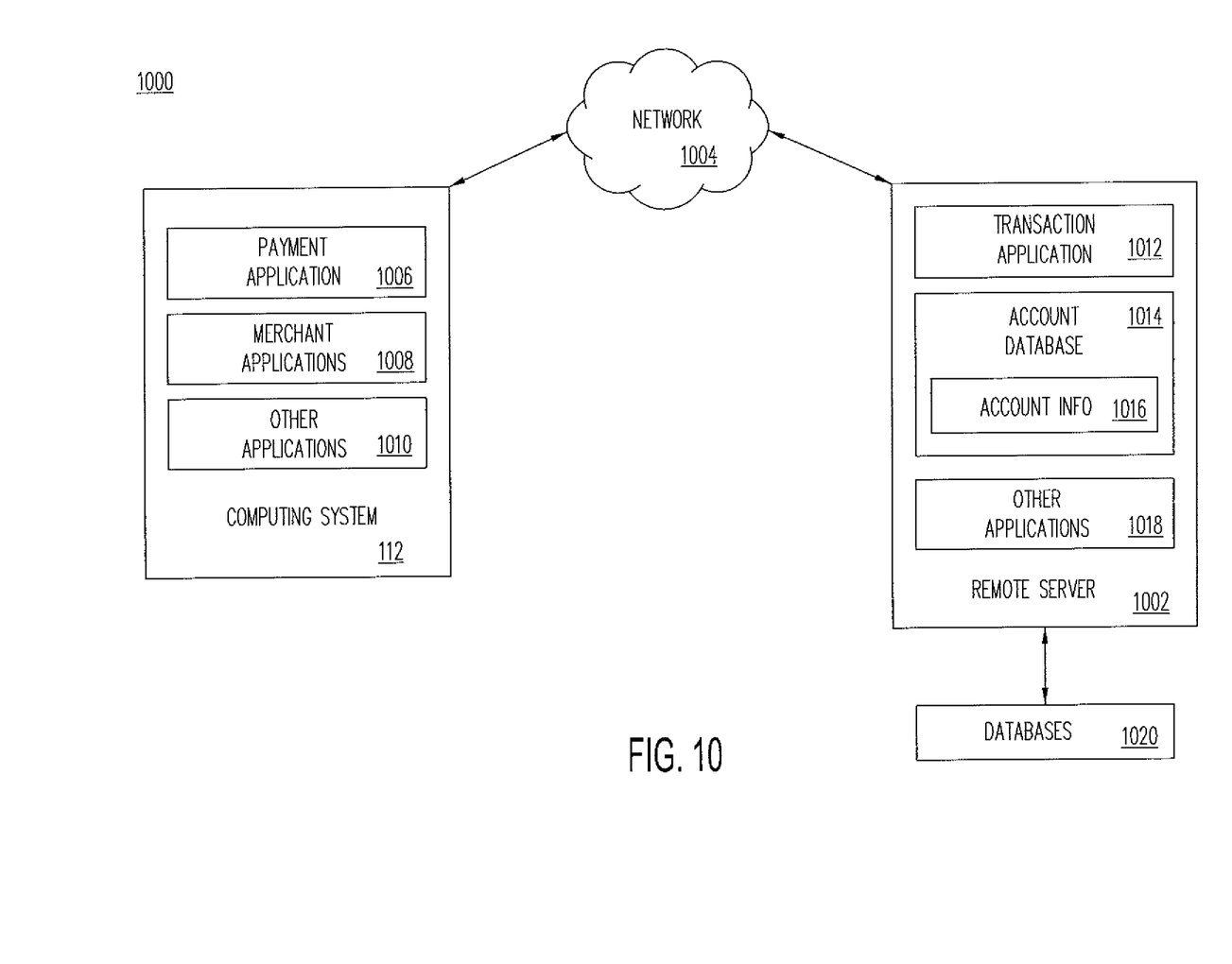
FIG. 10 is a block diagram of a networked system, consistent with some embodiments.

FIG. 10 is a block diagram of a networked system 1000, consistent with some embodiments. System 1000 includes a computing device 112 and a remote server 1002 in communication over a network 1004. Remote server 1002 may be a payment processing service provider server that may be maintained by a payment processing service provider, such as PayPal, Inc. of San Jose, Calif. Remote server 1002 may be maintained by other service providers in different embodiments. Remote server 1002 may also be maintained by an entity with which sensitive credentials and information may be exchanged with computing system 112. Remote server 1002 may be more generally a web site, an online content manager, a service provider, such as a bank, or other entity who provides content to a user requiring user authentication or login.

Network 1004, in one embodiment, may be implemented as a single network or a combination of multiple networks. For example, in various embodiments, network 1004 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Computing device 112, in one embodiment, may be implemented using any appropriate combination of hardware and/or software configured for wired and/or wireless communication over network 1004. In particular, computing device 112 may be a smartphone or tablet computer, such as described above. Consistent with some embodiments, computing device 112 may include any appropriate combination of hardware and/or software having one or more processors and capable of reading instructions stored on a tangible non-transitory machine-readable medium for execution by the one or more processors. Consistent with some embodiments, computing device 112 includes a machine-readable medium, such as a memory (not shown) that includes instructions for execution by one or more processors (not shown) for causing computing device 112 to perform specific tasks. For example, such instructions may include a payment application 1006 that may allow a merchant or customer use computing device 112 to authorize a payment. In some embodiments, payment application 1006 may be configured to interface with remote server 1002 over network 1004 to authorize payments processed by remote server 1002.

Computing device 112 may also include one or more merchant applications 1008. In some embodiments, merchant applications 1008 may be applications that allow a merchant or buyer to use computing device 112 in POS system 100. Merchant applications 1008 may include any applications that allow a merchant or customer to, scan goods and/or services (collectively referred to as items or products) to create a bill of sale or invoice, and then pay for the items using payment application 1006 and/or a card reader, such as card reader 114, mobile card reader 116, or card reader 904. Merchant applications 1008 may allow a merchant to accept various credit, gift, or debit cards, cash, or payment processing service providers, such as PayPal, Inc., of San Jose, Calif., such as may be provided by remote server 1002, for payment for items.

Computing device 112 may include other applications 1010 as may be desired in one or more embodiments to provide additional features available. For example, applications 1010 may include interfaces and communication protocols that allow a merchant or customer receive and transmit information through network 1004 and to remote server 1002 and other online sites. Applications 1010 may also include security applications for implementing client-side security features, programmatic client applications for interfacing with appropriate APIs over network 1004 or various other types of generally known programs and/or applications. Applications 1010 may include mobile applications downloaded and resident on computing device 112 that enables merchants and customers to access content through applications 1010.

Remote server 1002, according to some embodiments, may be maintained by an online payment provider or payment processing provider, which may provide processing for online financial and payment transactions on behalf of users including merchants and customers. Remote server 1002 may include at least transaction application 1012, which may be configured to interact with merchant applications 1008 of computing device 112 over network 1004 to receive and process transactions. Remote server 1002 may also include an account database 1014 that includes account information 1016 for users having an account on remote server 1002, such as a customer or merchant. In some embodiments, transaction application 1012 may store and retrieve financial information in account information 1016 of account database 1014. Remote server 1002 may include other applications 1018, such as may be provided for authenticating users to remote server 1002, for performing financial transactions, and for processing payments. Remote server 1002 may also be in communication with one or more external databases 1020, that may provide additional information that may be used by remote server 1002. In some embodiments, databases 1020 may be databases maintained by third parties, and may include third party financial information of merchants and customers.

Although discussion has been made of applications and applications on computing device 112 and remote server 1002, the applications may also be, in some embodiments, modules. Module, as used herein, may refer to a software module that performs a function when executed by one or more processors or Application Specific Integrated Circuit (ASIC) or other circuit having memory and at least one processor for executing instructions to perform a function, such as the functions described as being performed by the described applications.

Figure 11:
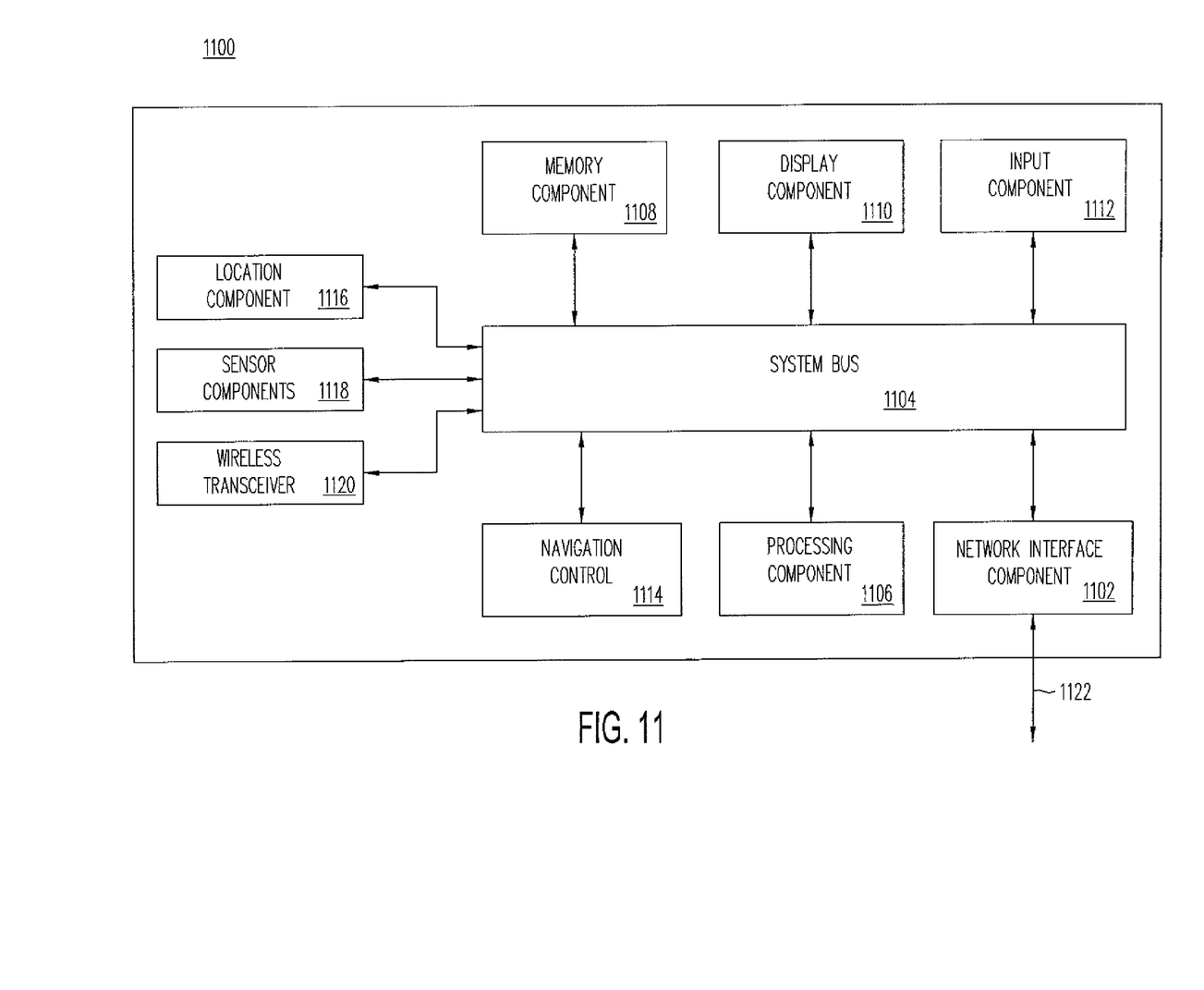
FIG. 11 is a diagram illustrating a computing system, consistent with some embodiments.

FIG. 11 is a diagram illustrating computing system 1100, which may correspond to either of client computing device 102 or remote server 104, consistent with some embodiments. Computing system 1100 may be a mobile device such as a smartphone, a tablet computer, and the like as would be consistent with computing device 112. Further, computing system 1100 may also be a server or one server amongst a plurality of servers, as would be consistent with remote server 104. As shown in FIG. 11, computing system 1100 includes a network interface component (NIC) 1102 configured for communication with a network such as network 1006 shown in FIG. 10. Consistent with some embodiments, NIC 1102 includes a wireless communication component, such as a wireless broadband component, a wireless satellite component, or various other types of wireless communication components including radio frequency (RF), microwave frequency (MWF), and/or infrared (IR) components configured for communication with network 1006. Consistent with other embodiments, NIC 1102 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 1006.

Consistent with some embodiments, computing system 1100 includes a system bus 1104 for interconnecting various components within computing system 1100 and communicating information between the various components. Such components include a processing component 1106, which may be one or more processors, micro-controllers, graphics processing units (GPUs) or digital signal processors (DSPs), and a memory component 1108, which may correspond to a random access memory (RAM), an internal memory component, a read-only memory (ROM), or an external or static optical, magnetic, or solid-state memory. Consistent with some embodiments, computing system 1100 further includes a display component 1110 for displaying information to a user of computing system 1100. Display component 1110 may be a liquid crystal display (LCD) screen, an organic light emitting diode (OLED) screen (including active matrix AMOLED screens), an LED screen, a plasma display, or a cathode ray tube (CRT) display. Computing system 1100 may also include an input component 1112, allowing for a user of computing system 1100, to input information to computing system 1100. Such information could include payment information such as an amount required to complete a transaction, account information, authentication information such as a credential, or identification information. An input component 1112 may include, for example, a keyboard or key pad, whether physical or virtual. Computing system 1100 may further include a navigation control component 1114, configured to allow a user to navigate along display component 1110. Consistent with some embodiments, navigation control component 1114 may be a mouse, a trackball, or other such device. Moreover, if device 1100 includes a touch screen, display component 1110, input component 1112, and navigation control 1114 may be a single integrated component, such as a capacitive sensor-based touch screen.

Computing system 1100 may further include a location component 1116 for determining a location of computing system 1100. In some embodiments, location component 1116 may correspond to a GPS transceiver that is in communication with one or more GPS satellites. In other embodiments, location component 1116 may be configured to determine a location of computing system 1100 by using an internet protocol (IP) address lookup, or by triangulating a position based on nearby telecommunications towers, wireless access points (WAPs), or BLE beacons. Location component 1116 may be further configured to store a user-defined location in memory component 1108 that can be transmitted to a third party for the purpose of identifying a location of computing system 1100. Computing system 1100 may also include sensor components 1118. Sensor components 1118 provide sensor functionality, and may correspond to sensors built into, for example, computing device 112 or sensor peripherals coupled to computing device 112. Sensor components 1118 may include any sensory device that captures information related to computing device 112 or a merchant or customer using computing device 112 and any actions performed using computing device 112. Sensor components 1118 may include camera and imaging components, accelerometers, biometric readers, GPS devices, motion capture devices, and other devices. Computing system 1100 may also include one or more wireless transceivers 1120 that may each include an antenna that is separable or integral and is capable of transmitting and receiving information according to one or more wireless network protocols, such as Wi-Fi™, 3G, 4G, HSDPA, LTE, RF, NFC, IEEE 802.11a, b, g, n, ac, or ad, Bluetooth®, BLE, WiMAX, ZigBee®, etc. With respect to computing device 112, wireless transceiver 1120 may include BLE beacon 512, NFC module 508, and Wi-Fi router 510 shown in FIG. 5.

Computing system 1100 may perform specific operations by processing component 1106 executing one or more sequences of instructions contained memory component 1108. In other embodiments, hard-wired circuitry may be used in place of or in combination with software instructions to implement the present disclosure. Logic may be encoded in a computer readable medium, which may refer to any medium that participates in providing instructions to processing component 1106 for execution, including memory component 1108. Consistent with some embodiments, the computer readable medium is tangible and non-transitory. In various implementations, non-volatile media include optical or magnetic disks, volatile media includes dynamic memory, and transmission media includes coaxial cables, copper wire, and fiber optics, including wires that comprise system bus 1104. According to some embodiments, transmission media may take the form of acoustic or light waves, such as those generated during radio wave and infrared data communications. Some common fauns of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 1100. In various other embodiments of the present disclosure, a plurality of computing systems 1100 coupled by a communication link 1122 to network 1006 (e.g., such as a LAN, WLAN, PTSN, and/or various other wired or wireless networks, including telecommunications, mobile, and cellular phone networks) may perform instruction sequences to practice the present disclosure in coordination with one another. Computing system 1100 may transmit and receive messages, data and one or more data packets, information and instructions, including one or more programs (i.e., application code) through communication link 1122 and network interface component 1102 and/or wireless transceiver 1120. Received program code may be executed by processing component 1106 as received and/or stored in memory component 1108.

Computing system 1100 may include more or less components than shown in FIG. 11 according to some embodiments. For example, if computing system 1100 corresponds to computing device 112, such as shown in FIG. 5 and not specifically referred to in FIG. 11. Moreover, components shown in FIG. 11 may be directly coupled to one or more other components in FIG. 11, eliminating a need for system bus 1104. Furthermore, components shown in FIG. 11 may be shown as being part of a unitary system 1100, but may also be part of a distributed system where the components are separate but coupled and in communication. In general, the components shown in FIG. 11 are shown as examples of components in a computing system 1100 capable of performing embodiments disclosed herein. However, a processing system 1100 may have more or fewer components and still be capable of performing some embodiments disclosed herein.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide POS systems with additional functionalities and form factors, and provide a convenient bridge between traditional stationary POS systems and mobile POS systems. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A point-of-sale system, comprising:
a stand comprising:
an adjustable arm configured to be adjusted between at least a first stand position and a second stand position; and
a housing coupled to the stand, the housing comprising:
a first housing portion having a printed circuit board (PCB) attached thereto; and
a second housing portion having a side panel attached to a first side and a magnetic stripe reader attached to a second side, wherein:
the housing is configured to removably enclose a computing device having a touch-enabled display between the first housing portion and the second housing portion such that the computing device is removable through at least the side panel and faces a merchant at the first stand position, and faces a customer at the second stand position; and
the housing having a locking mechanism that may be unlocked by entering a security credential into the computing device.

2. The point-of-sale system according to claim 1, wherein the adjustable arm is further configured to be collapsible such that the computing device may lie flat on the stand.

3. The point-of-sale system of claim 1, wherein the first housing portion further comprises a near-field communication (NFC) module, a power supply, one or more universal serial bus (USB) ports, a wireless routing device, and a Bluetooth low energy (BLE) module mounted on or attached to the PCB.

4. The point-of-sale system of claim 1, wherein the computing device comprises one of a tablet computer, and a smartphone.

5. The point-of-sale system of claim 1, wherein dimensions of the housing are set based on dimensions of the computing device.

6. The point-of-sale system of claim 1, wherein the housing is configured to removably enclose computing devices having different form factors.

7. The point-of-sale system of claim 1, further comprising a register component, the stand being coupled to the register component.

8. The point-of-sale-system of claim 7, wherein the register component comprises a cash till, a receipt outlet, and one or more bill collection slots, the cash till comprising a cash collection area and a printer.

9. The point-of-sale system of claim 1, further comprising a secondary system, the secondary system comprising a housing removably enclosing a secondary computing device.

10. The point-of-sale system of claim 9, wherein the secondary computing device comprises a form factor that is smaller than the computing device.

11. The point-of-sale system of claim 1, further comprising an Europay, Mastercard, Visa (EMV) device coupled to the housing.

12. The point-of-sale system of claim 11, wherein the EMV device comprises a masked display, a number entry pad, and a card slot.

13. The point-of-sale system of claim 1, wherein the computing device is in communication with a payment service provider server over a network.

14. The point-of-sale system of claim 13, wherein the payment service provider server processes transactions performed at the point-of-sale system.

15. A point-of-sale system, comprising:
a housing configured to support a computing device having a touch-enabled display in communication with a payment service provider over a network, the payment service provider server processes transactions performed at the point-of-sale system, the housing having a locking mechanism that may be unlocked by entering a security credential into the computing device;
a stand coupled to the housing; and
a card reader coupled to the housing and the stand.

16. The point-of-sale system of claim 15, wherein the stand is configured to be adjusted between at least a first stand position and a second stand position.

17. The point-of sale system of claim 16, wherein the stand comprises an adjustable arm.

18. The point-of-sale system of claim 15, wherein the stand is configured to be mounted on a cart.

19. The point-of-sale system of claim 15, wherein the computing device comprises one of a tablet computer, and a smartphone.

20. The point-of-sale system of claim 19, wherein dimensions of the housing are set based on dimensions of the computing device.

21. The point-of-sale system of claim 15, wherein the card reader is removable.

22. The point-of-sale system of claim 15, wherein the card reader and the stand are integral to the housing.

* * * * *